| United States Patent [19] | | [11] | 4,248,995 |
|---|---|---|---|
| Fayolle | | [45] | Feb. 3, 1981 |

[54] PROCESS FOR THE PRODUCTION OF ALKYLAROMATIC COPOLYESTERS

[75] Inventor: Bernard Fayolle, Ecully, France

[73] Assignee: Rhone-Poulenc Industries, Paris, France

[21] Appl. No.: 78,714

[22] Filed: Sep. 25, 1979

[30] Foreign Application Priority Data

Oct. 5, 1978 [FR] France .............................. 78 28948

[51] Int. Cl.$^3$ .............................................. C08G 63/18
[52] U.S. Cl. .................................... 528/171; 528/176; 528/190; 528/191; 528/194; 528/295; 528/298; 528/299
[58] Field of Search ............... 528/171, 176, 190, 191, 528/194, 295, 298, 299

[56] References Cited

U.S. PATENT DOCUMENTS

| 3,567,687 | 3/1971 | Lohwasser et al. ................. 528/171 |
| 3,740,375 | 6/1973 | Novak .............................. 528/171 X |
| 4,064,108 | 12/1977 | Inata et al. ....................... 528/190 X |
| 4,071,499 | 1/1978 | Stackman et al. ................... 528/176 |
| 4,083,829 | 4/1978 | Calundann et al. ................. 528/176 |
| 4,197,393 | 4/1980 | Swedo et al. ..................... 528/190 X |

*Primary Examiner*—Lucille M. Phynes
*Attorney, Agent, or Firm*—Stevens, Davis, Miller & Mosher

[57] ABSTRACT

A process is disclosed for the production of alkylaromatic copolyesters, characterized in that there are reacted, successively, at a temperature below 250° C., a diester of a dihydroxyaromatic compound and an aliphatid diacid of the general formula HOOC(CH$_2$)$_n$COOH, in which $3 \leq n \leq 10$, with a molar ratio of the diester to the diacid of between 1.5 and 4, until the degree of completion of the reaction is greater than or equal to 85%, and them, at a temperature above 250° C., an aromatic and/or cycloaliphatic dicarboxylic acid, and in that the product obtained is subjected to a polycondensation reaction under reduced pressure for a duration which is less than or equal to 1 hour 30 minutes. This process makes it possible to produce copolyesters which may be readily converted in the molten state to threads, films and molded articles.

11 Claims, No Drawings

PROCESS FOR THE PRODUCTION OF ALKYLAROMATIC COPOLYESTERS

The present invention relates to a process for the production of high molecular weight, weakly colored alkylaromatic copolyesters which may be readily shaped. A reaction of this kind can be carried out rapidly with a good yield. The invention also relates to the products obtained in accordance with this process.

It is already known, for example from French Pat. No. 1,547,346, to prepare aromatic copolyesters from halogen-containing diphenols and dicarboxylic acid chlorides. However, this process has the disadvantage that it increases the production cost of the polymers, because of the use of an acid chloride, and that it favors certain undesirable secondary reactions.

It is also known, according to Japanese Application No. 65,598/77, to prepare alkylaromatic copolyesters from an aromatic diacid, an aliphatic diacid, and a diester of an aromatic dihydroxy compound, by simultaneously heating these compounds at atmospheric pressure, in the presence of an inert gas, and then carrying out a polycondensation reaction in vacuo, using a temperature range above 250° C., the total duration of the reaction according to the examples being more than 6 hours. However, a process of this kind does not make it possible to obtain very high molecular weight copolyesters, such molecular weights being demonstrated by the inherent viscosity of the copolyesters. Furthermore, these polyesters possess an undesirable coloration.

In accordance with the present invention, a process has now been found for producing high molecular weight alkylaromatic copolyesters by first reacting a diester of a dihydroxyaromatic compound with an aliphatic diacid, at a temperature below 250° C., with a molar ratio of the diester to the diacid of between 1.5 and 4, until the degree of completion of the reaction is at least 85%, and then continuing the reaction at a temperature above 250° C., after adding an aromatic and/or cycloaliphatic dicarboxylic acid, and carrying out a polycondensation reaction under reduced pressure for a time which is less than or equal to 1 hour 30 minutes.

The term "diester of a dihydroxyaromatic compound", which, for greater convenience in the following text, will be denoted by the shorter term diphenol diester, is to be understood as meaning compounds of the formula RCOO—X—OOCR, in which R is a radical $CH_3(CH_2)_n$; in which n=0 to 8 and preferably n=0 for economic reasons; and X is an ortho-, meta-, or para-phenylene, 4,4'-diphenylene, diphenylene sulphone, diphenylene ether, diphenylenealkane or diphenoxyalkane radical, in which radicals each of the phenylene nuclei may contain, for example, 1 or 2 substituents chosen from amongst halogen atoms (preferably chlorine or bromine), or methyl, ethyl, or methoxy radicals.

The term "aliphatic diacid" is to be understood as meaning the diacids of the general formula $HOOC(CH_2)_nCOOH$, in which $3 \leq n \leq 10$, used by themselves or as a mixture. Amongst these diacids, there may be mentioned glutaric acid, sebacic acid, and, preferably, adipic acid.

The first stage of the process is carried out with a molar ratio of diphenol diester/aliphatic diacid of between 1.5 and 4, preferably between 2 and 4, under an inert atmosphere (for example nitrogen or argon), until a degree of completion of the reaction of at least 85% and preferably at least 90% (calculated in terms of the amount of aliphatic acid converted) is reached. The reaction may optionally be terminated under reduced pressure.

The acidolysis reaction of the diphenol diester with the aliphatic diacid takes place at a temperature which is less than 250° C. and preferably less than or equal to 240° C. This first stage may be carried out in the presence of specific catalysts such as magnesium acetate, zinc acetate, calcium acetate, manganese acetate, antimony trioxide, and tetrabutyl orthotitanate. It takes place over a relatively short period of time which is generally only slightly in excess of 1 hour.

The second stage of the acidolysis reaction consists or consists essentially in the introducing an aromatic and/or cycloaliphatic dicarboxylic acid, at a temperature which is above 250° C. and more generally between 250° C. and 320° C., at atmospheric pressure and under an inert atmosphere, with a molar ratio of diphenol diester/total amount of diacids of between 0.95 and 1.05.

The term "aromatic and/or cycloaliphatic dicarboxylic acids" is to be understood as meaning diacids of the general formula HOOC—Y—COOH, in which Y represents a meta- or para-phenylene, 1,3- or 1,4-cyclohexylene, 4,4'-diphenylene, diphenylene sulphone, diphenylene ether, diphenylenealkane or diphenoxyalkane radical, or a radical containing fused aromatic nuclei of which the free bonds are located in the 2,6- or 2,7-positions, it being possible for each of the rings to contain, for example, 1 or 2 substituents chosen from amongst halogen atoms (preferably chlorine or bromine), and methyl, ethyl or methoxy radicals.

Amongst these diacids, there may be mentioned: terephthalic acid, isophthalic acid, 4,4'-dicarboxybiphenyl, 4,4'-dicarboxydiphenyl ether, 1,2-(p,p'-dicarboxydiphenoxy)-ethane, 2,6-dicarboxynaphthalene, hexahydroterephthalic acid, and the like.

Compared with the known processes, the acidolysis reaction carried out in two stages according to the present invention gives a better yield and the amount of by-products formed during the reaction is smaller.

Furthermore, the process according to the invention is generally carried out over a shorter period of time than the known processes.

After the polycondensation reaction under high vacuum for a time which is less than or equal to 1 hour 30 minutes, high molecular weight, weakly colored aromatic copolyesters are obtained. They possess, in particular, a higher inherent viscosity and a less pronounced coloration than the copolyesters obtained in accordance with the process of Japanese Application No. 65,598/77.

The copolyesters thus obtained may generally be extruded, converted to films, and/or molded in the molten state, depending on the compounds from which they are derived.

The following examples, in which the parts are to be understood as being parts by weight, are given by way of indication, but without implying any limitation, in order still better to illustrate the invention.

In these examples, the inherent viscosity is measured at 25° C. on a 0.5% strength solution in a p-chlorophenol/dichloroethane mixture (50/50 by volume).

The luminance measurements are carried out on a Leres spectrophotometer of the "Trilac" type.

EXAMPLE 1

77.6 parts of hydroquinone diacetate, 35.04 parts of adipic acid, and 0.0608 part of magnesium acetate are introduced into a 350 ml polycondensation reactor equipped with a stirrer and heated by a metal bath.

The apparatus is purged with argon and the mixture is heated with the metal bath. The reaction starts at 230° C. and lasts for 55 minutes at atmospheric pressure, the temperature reaching 243° C. at the end of this stage. The pressure is lowered to 400 mm of mercury in the course of 5 minutes and is maintained for 10 minutes at the end of the reaction.

The total duration of the first stage is 1 hour 10 minutes, during which time acetic acid distils.

The degree of conversion (calculated in terms of the amount of adipic acid converted) is 92.3%.

26.56 parts of terephthalic acid are then introduced and the temperature of the reaction mixture is raised to 270° C. and reaches 325° C. at the end of the reaction. The reaction lasts for about 1 hour 40 minutes at atmospheric pressure and the degree of conversion, calculated relative to the total amount of the diacids, is 87.7%.

The pressure is then lowered in the course of 30 minutes to 5 mm of mercury and then to 1 mm and the polycondensation reaction is carried out at this pressure for 15 minutes at 320° C.

Reaction parameters:
total time: 3 hours 20 minutes
yield of the acidolysis reaction:
  end of the 1st stage: 92.3%
  end of both stages: 87.7%
adipic acid cyclized: 6%

The polyester obtained possesses the following characteristics:
inherent viscosity: 0.65 dlg$^{-1}$
luminance Y: 22.8
softening point SP: >350° C.

EXAMPLE 2

77.6 parts of hydroquinone diacetate, 29.2 parts of adipic acid, and 0.0608 part of magnesium acetate are introduced into an identical reactor to that used in Example 1.

The apparatus is purged with argon and the reactants are heated by means of a metal bath. The reaction starts at 230° C. and ends, after 1 hour 10 minutes, at 235° C. under reduced pressure (400 mm of mercury for 10 minutes). The acetic acid which has distilled is collected. The degree of conversion is 94.1%.

33.2 parts of isophthalic acid are then introduced and the temperature of the reaction mixture reaches 246° C. This second stage is continued at atmospheric pressure for 1 hour 15 minutes, the final temperature reaching 269° C. The yield of the acidolysis reaction is 82.9%.

The pressure is lowered to 1 mm of mercury in the course of 40 minutes and the polycondensation reaction is carried out for 17 minutes at 283° C.

The reaction parameters are as follows:
total duration of the reaction: 3 hours 22 minutes
yield of the acidolysis reaction:
  end of the 1st stage: 94.1%
  end of both stages: 82.9%
adipic acid cyclized: 6%

The copolyester obtained in accordance with the above process possesses the following characteristics:
inherent viscosity (measured in accordance with the method described in Example 1): 0.76 dlg$^{-1}$
luminance Y: 24.194
softening point SP: 265° C.

EXAMPLE 3

By way of comparison, the following reactants are introduced into an identical apparatus to that described in Example 1.
hydroquinone diacetate: 77.6 parts
adipic acid: 29.2 parts
isophthalic acid: 33.2 parts
magnesium acetate: 0.0608 part The apparatus is purged with nitrogen and the reaction mixture is heated until the temperature thereof is 250°–260° C., this temperature being maintained for 3 hours whilst the acetic acid distils. The reaction is continued for 15 minutes at 260°–270° C. whilst the pressure is lowered to 15 mm of mercury, and the polycondensation reaction is then continued over a period of 3 hours 30 minutes at 285° C. under the pressure of 0.2 mm of mercury.

Reaction parameters:
total duration: 6 hours 45 minutes
yield of the acidolysis reaction: 76.04%
adipic acid cyclized: 14.75%

The copolyester obtained has the following properties:
inherent viscosity: 0.47 dlg$^{-1}$
luminance Y: 7.433
softening point SP: 265° C.

It is seen that the inherent viscosity and the luminance of this copolyester are substantially lower than those of the copolyester obtained in Example 2 with the same amounts of the same reactants, but in accordance with the process of the present invention.

EXAMPLE 4

83.4 parts of methylhydroquinone diacetate, 29.2 parts of adipic acid, and 0.0608 part of magnesium acetate are introduced into a 350 ml polycondensation reactor of the type described in Example 1.

The apparatus is purged with argon and the mixture is heated with a metal bath. The reaction starts at 285° C. and ends at 240° C. under reduced pressure (400 mm of mercury) after 1 hour 10 minutes. The yield of the reaction is 91.04%.

33.2 parts of terephthalic acid are then introduced at atmospheric pressure and the temperature of the reaction mixture is raised to 272° C., reaching a temperature of 283° C. at the end of the reaction after 2 hours 5 minutes. The degree of conversion, calculated relative to the total amount of the diacids converted, is 86.7%. The pressure is then lowered in the course of 35 minutes to 2 mm of mercury, the temperature being 287° C. The polycondensation reaction is carried out at 283° C. for 15 minutes.

Reaction parameters:
total duration: 4 hours 5 minutes
degree of conversion in the acidolysis reaction:
  at the end of the 1st stage: 91.4%
  at the end of both stages: 86.7%

The characteristics of the polymer obtained are as follows:
inherent viscosity: 1.22 dlg$^{-1}$
softening point SP: 207° C.
luminance Y: 35.517

EXAMPLE 5

By way of comparison, the following compounds are introduced into an identical reactor to that used in the preceding examples:

methylhydroquinone diacetate: 83.4 parts
adipic acid: 29.2 parts
terephthalic acid: 33.2 parts
magnesium acetate: 0.0608 part After purging the apparatus with nitrogen, the temperature of the reaction mixture is raised to 260° C. and the acidolysis reaction is carried out for about 3 hours, acetic acid being removed by means of a distillation column.

The degree of conversion in the acidolysis reaction is 82.7%.

The polycondensation reaction then starts with a gradual lowering of the pressure for 15 minutes until a value of 15 mm of mercury is reached. The pressure is further lowered to 0.2 mm of mercury in the course of 20 minutes, the temperature of the reaction mixture being 270° C. The polycondensation reaction is carried out over a period of 3 hours 10 minutes at 285° C.

The copolyester obtained, which is comparable to that obtained in Example 4, possesses the following characteristics:

inherent viscosity: 107 dlg$^{-1}$
softening point SP: 207° C.
luminance Y: 26.771

EXAMPLE 6

124.8 parts of 2,2-bis-(p-hydroxyphenyl)-propane diacetate, 29.2 parts of adipic acid, and 0.0608 part of magnesium acetate are introduced into an identical reactor to that of Example 1.

The apparatus is purged and the mixture is heated with a metal bath. The reaction starts at 235° C. and ends, after 1 hour 10 minutes, at 251° C. under reduced pressure.

Yield of the reaction: 88.75%.

33.2 parts of terephthalic acid are added and the temperature rises to 270° C. and reaches 283° C. after 2 hours. The degree of conversion, calculated relative to the total amount of the diacids, is 80.8%.

The pressure is gradually reduced in the course of 35 minutes and the polycondensation reaction takes place at a temperature of 280° C. under a pressure of 0.2 mm of mercury over a period of 25 minutes.

Reaction parameters:
total duration: 4 hours 10 minutes
yield of the acidolysis reaction:
after the 1st stage: 88.75%
after both stages: 80.8%
amount of adipic acid cyclized: 6%

The copolyester obtained has the following characteristics:

inherent viscosity: 0.45 dlg$^{-1}$
softening point SP: 207° C.
luminance Y: 22.8

EXAMPLE 7

By way of comparison, 124.8 parts of 2,2-bis-(p-hydroxphenyl)-propane diacetate, 29.2 parts of adipic acid, 33.2 parts of terephthalic acid, and 0.0608 part of magnesium acetate are introduced into an identical reactor to that used in accordance with Example 1.

The apparatus is purged with nitrogen and the reaction is carried out for 2 hours 260° C. and 7 hours at 265° C., acetic acid being removed by distillation.

Degree of conversion of the adipic acid: 82.7%.

The pressure is gradually reduced in the course of 20 minutes to 15 mm of mercury and the polycondensation reaction is carried out over a period of 3 hours 25 minutes at 285° C. under a pressure of 0.2 mm of mercury.

Reaction parameters:
yield of the acidolysis reaction: 79.9%
adipic acid cyclized: 9.85%

The copolyester thus obtained has the following properties, which are comparable to those of the copolyester obtained in Example 6:

inherent viscosity: 0.36 dlg$^{-1}$
softening point SP: 207° C.
luminance Y: 8.815

EXAMPLE 8

166.4 parts of methylhydroquinone diacetate, 46.72 parts of adipic acid, and 0.169 part of magnesium acetate are introduced into an identical reactor to that of Example 1.

The apparatus is purged and the mixture is heated with a metal bath. The acidolysis reaction starts at 225° C. and ends at 235° C. after 1 hour 15 minutes, the reaction being carried out under a pressure of 350 mm of mercury during the last 15 minutes. Yield of the reaction: 91.53%.

123.84 parts of 4,4'-dicarboxydiphenyl-ether are then added under atmospheric pressure and the 2nd stage of the acidolysis reaction resumes at 248° C. and ends at 285° C. after 2 hours 15 minutes.

The overall yield of both stages is 83.75%.

A vacuum is then gradually established in the course of 30 minutes and the polycondensation reaction takes place over a period of 40 minutes at 285° C. under a pressure of 3 mm of mercury.

Reaction parameters:
total duration: 4 hours 40 minutes
yield of the acidolysis reaction:
after the 1st stage: 91.53%
after both stages: 83.75%

The copolyester thus obtained has the following characteristics:

inherent viscosity: 0.384
flow point: 223° C.

What is claimed is:

1. A process for the production of an alkylaromatic copolyester, characterized in that there are reacted, successively, at a temperature below 250° C., a diester of a dihydroxyaromatic compound and an aliphatic diacid of the general formula HOOC(CH$_2$)$_n$COOH, in which $3 \leq n \leq 10$, with a molar ratio of the diester to the diacid of between 1.5 and 4, until the degree of completion of the reaction is greater than or equal to 85%, and then, at a temperature above 250° C., an aromatic and-/or cycloaliphatic dicarboxylic acid, and in that the product obtained is subjected to a polycondensation reaction under reduced pressure for a duration which is less than or equal to 1 hour 30 minutes.

2. A process for the production of an alkylaromatic copolyester, according to claim 1, characterized in that the ratio of the diester of a dihydroxyaromatic compound to the aliphatic diacid is between 2 and 4.

3. A process for the production of an alkylaromatic copolyester, according to claim 1, characterized in that the degree of completion of the reaction of the diester of a dihydroxyaromatic compound with the aliphatic diacid is at least 90%.

4. A process for the production of an alkylaromatic copolyester, according to claim 1, characterized in that the temperature of the reaction of the diester of a dihydroxyaromatic compound with the aliphatic diacid is less than or equal to 240° C.

5. A process for the production of an alkylaromatic copolyester, according to claim 1, characterized in that the reaction of the diester of a dihydroxyaromatic compound with the aliphatic diacid is carried out under an inert atmosphere.

6. A process for the production of an alkylaromatic copolyester, according to claim 1, characterized in that the reaction of the diester of a dihydroxyaromatic compound with the aliphatic diacid is terminated under reduced pressure.

7. A process for the production of an alkylaromatic copolyester, according to claim 1, characterized in that the molar ratio of diester of a dihydroxyaromatic compound/total amount of diacids is between 0.95 and 1.05.

8. A process for the production of an alkylaromatic copolyester, according to claim 1, characterized in that the diester of dihydroxyaromatic compound is chosen from amongst compounds of the formula R—COO—X—OOCR, in which: R is a radical $CH_3(CH_2)_n$, in which $n=0$ to 8, and X is an ortho-, meta- or para-phenylene, 4,4'-diphenylene, diphenylene sulphone, diphenylene ether, diphenylenealkane or diphenoxyalkane radical, in which radicals each of the phenylene nuclei may contain 1 to 2 substituents chosen from amongst halogen atoms, and methyl, ethyl and methoxy radicals.

9. A process according to claim 9, wherein $n=0$.

10. A process for the production of an alkylaromatic copolyester, according to claim 1, characterized in that the aromatic or cycloaliphatic dicarboxylic acid is chosen from amongst the diacids of the formula HOOC-Y-COOH, in which Y represents a meta or para-phenylene, 1,3- or 1,4-cyclohexylene, 4,4'-diphenylene, diphenylene sulphone, diphenylene ether, diphenylenealkane or diphenoxyalkane radical, or a radical containing fused aromatic nuclei of which the free bonds are in the 2,6- or 2,7-positions, it being possible for each of the rings to contain 1 to 2 substituents chosen from amongst halogen atoms, and methyl, ethyl and methoxy radicals.

11. A process according to claim 10, wherein the halogen atoms are chlorine or bromine.

* * * * *